United States Patent [19]
Lewis

[11] Patent Number: 6,059,849
[45] Date of Patent: May 9, 2000

[54] BARBECUE SMOKER DEVICE FOR BARBECUE GRILLS

[76] Inventor: Clayton C. Lewis, 175 Levy Bay Rd., Panacea, Fla. 32346

[21] Appl. No.: 09/258,593

[22] Filed: Feb. 26, 1999

Related U.S. Application Data

[63] Continuation-in-part of application No. 08/925,104, Sep. 8, 1997, abandoned.

[51] Int. Cl.[7] .................................. C01L 5/40; C01L 5/00
[52] U.S. Cl. ................................ 44/530; 44/532; 44/590; 44/606
[58] Field of Search .................................................. 44/530

[56] References Cited

U.S. PATENT DOCUMENTS

| | | | |
|---|---|---|---|
| 4,095,957 | 6/1978 | Orsing | 44/40 |
| 4,485,584 | 12/1984 | Raulerson et al. | 44/531 |
| 4,779,525 | 10/1988 | Gaines | 99/482 |
| 4,787,914 | 11/1988 | Crace | 44/560 |
| 4,857,074 | 8/1989 | Crace | 44/540 |
| 4,874,396 | 10/1989 | McLeod | 44/589 |
| 4,934,272 | 6/1990 | Sternin et al. | 44/590 |
| 4,941,889 | 7/1990 | Holmes | 44/590 |
| 5,048,406 | 9/1991 | Cofer | 99/482 |

*Primary Examiner*—Ellen M. McAvoy
*Attorney, Agent, or Firm*—Allen, Dyer, Doppelt, Milbrath & Gilchrist, P.A.

[57] ABSTRACT

A barbecue smoker device for placing in a barbecue grill for generating flavoring smoke when heated, the barbecue smoker device including a leakproof noncombustible body having an inner cavity, an opening positioned to connect to the inner cavity to thereby provide access to the inner cavity, presoaked wood chips positioned within the inner cavity to thereby generate smoke when the barbecue smoker device is placed in the barbecue grill, a lid positioned on the opening to thereby hermetically seal the presoaked wood chips within the inner cavity, and an associated method.

14 Claims, 1 Drawing Sheet

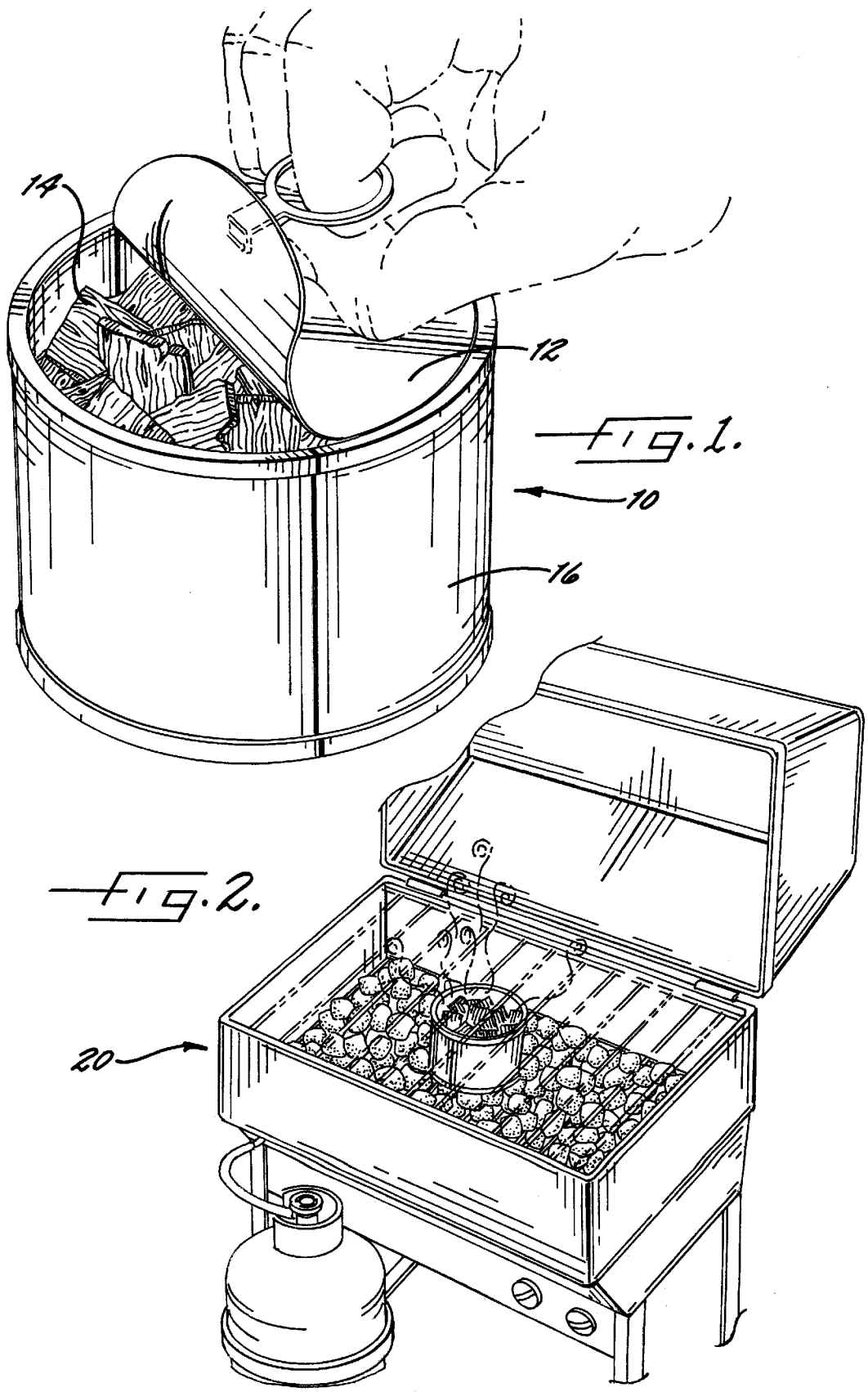

BARBECUE SMOKER DEVICE FOR BARBECUE GRILLS

RELATED APPLICATIONS

This application is a continuation-in-part of application ser. No. 08/925,104, which has a filing date of Sep. 8, 1997.

FIELD OF THE INVENTION

The present invention relates to the field of barbecue grills and, more particularly, to a barbecue smoker device for placing in a barbecue grill for generating smoke for flavoring the food being cooked in the barbecue grill or the like.

BACKGROUND OF THE INVENTION

The art of barbecue cooking has proliferated with the advent of the modern propane gas fired barbecue grill. Such gas grills are extremely convenient in that the cooking fire is instantaneous and the barbecue grill achieves the desired cooking temperature within a few minutes. In contrast, the old-fashioned charcoal grill is inconvenient in that it takes considerably longer getting to the point where the coals are ready for cooking, usually requires a starter fuel, and totally consumes the charcoal during cooking, thus requiring replacement with new charcoal for each cooking session. A charcoal fire, however, releases smoke which serves to add flavor to the food, a property not shared by the gas fired grill. Therefore, various devices and methods have been used to generate flavoring smoke in a gas fired barbecue grill, in order to enhance the flavor of food prepared on a gas grill.

A combustible fuel element for use in barbecue grills was patented by Orsing in 1978 (U.S. Pat. No. 4,095,957). The Orsing invention is a fuel element, such as charcoal, coal, wood chips and coke, impregnated with a combustible fluid to aid in igniting the fuel. The Orsing fuel elements are encased in a porous, noncombustible casing made preferably of nonwoven glass fiber. The fuel elements so encased are further enclosed in an envelope of nonporous, gas and fluid impermeable inert flexible plastic sheet material acting as the outer container for holding the product on the shelf. This outer container, or envelope, must be removed and discarded before placing the Orsing fuel elements in the barbecue for igniting. Orsing's fuel elements do not solve the problem of creating smoke in a gas fired grill because they are not suitable for use in a gas grill but, rather, are intended for producing the cooking fire in a conventional barbecue grill, and in so doing also produce smoke for flavoring the food.

A smoke generating device suitable for use in a gas barbecue was invented by Gaines and was issued U.S. Pat. No. 4,779,525 in 1988. The Gaines device includes a noncombustible container, preferably formed in the shape of a cylinder, having at least one smoke exhaust hole, but preferably having a plurality of holes only in the top of the container so as to limit the rate of air flow through the container and thereby promote slow smoldering of the smoke producing material, including wood chips. The Gaines invention teaches that the size of the holes in the container is of crucial importance. Gaines points out that if the holes are too large then too much air will enter the container and the smoke producing material will ignite and combust, which is undesirable for proper smoke production. Gaines, in addition, teaches that large holes admit flaming fat dripping from the meat cooking above the smoke generating device, also helping to ignite the contents of the cylinder and preventing proper smoke generation. Accordingly, the Gaines device has multiple small holes on its top side and must be placed into the barbecue in its proper orientation for the smoke to be released through such holes. An alternate embodiment of the Gaines invention is an aluminum cup filled with the smoke generating material and covered with a perforated piece of foil which is crimped to the lip of the cup; a combustible cover is provided over the perforations in the foil. The Gaines invention specifically teaches that for proper performance the smoke generating device must have multiple small holes rather than one large hole, to thereby limit oxygen supply to the smoke generating material and to prevent burning fat drippings from igniting the smoke generating material. The Gaines container, therefore, has the disadvantage of requiring more complex manufacturing to produce and to package for sale, since the multiple holes must be first formed and later covered for handling during shipping and sale.

Barbecue flavoring blocks invented by Holmes were granted U.S. Pat. No. 4,941,889 in 1990. The Holmes invention consists of wood chips bound together by a hard gelatin in water solution, which may include added flavorings to enhance the natural smoke flavor of the wood. The blocks are pasteurized to eliminate harmful microorganisms, are then coated with a protective coating, and packaged for sale. In use, the Holmes blocks are placed directly into the barbecue grill fire and produce smoke as the hard gelatin coating melts. If so used in a gas fired barbecue grill, the hard gelatin, added flavorings, wood resins and ash would drop onto the burners and foul the gas jets, affecting the operation of the barbecue. Holmes teaches that indirect heating of the blocks is preferred when the heat source for cooking is gas or electric. Indirect heating is achieved by placing the blocks in a separate drawer or location of the barbecue. Additionally, Holmes indicates that it is preferred that the blocks receive an insufficient source of oxygen during combustion, so that they do not burn but smoke instead. The Holmes invention, however, offers no solutions to the problems of how to indirectly heat the blocks so that the barbecue's burners are not fouled, or how to provide insufficient oxygen to the blocks during cooking.

A disposable/refillable smoke cartridge for gas barbecue grills was disclosed by Cofer in 1991 in U.S. Pat. No. 5,048,406. The Cofer device is preferably a cylindrical cartridge containing wood chips. The cartridge may be partially opened on one side by a pull-tab ring to allow smoke to escape, or may have small perforations on one end of its top or side walls for the same purpose. The cartridge may also have small perforations on one end of its bottom wall to provide for draft ventilation. Cofer continues the approach previously taught by Gaines, using only small openings into the cylinder or placing an opening in a recess, under an extension tube, or behind a shield to prevent grease from dripping into the cylinder, causing a fire in the wood chips. In addition, Cofer recommends that the cylinder be tilted with the smoke releasing end of the cylinder further elevated over the fire than the opposite end of the cylinder. Cofer states that this elevation is useful for optimum emission of smoke, and for lessening the chance that the wood chips will catch fire since the elevation keeps part of the wood chips and gases farther from direct heat than the other end of the cylinder. Cofer touts as a further advantage of the invention the fact that the wood chips need not be presoaked. In addition, Cofer states that if the device catches fire it can be readily blown out or doused by splashing with water, although it is difficult to see how water could be splashed onto the fire inside a device having such small access holes.

SUMMARY OF THE INVENTION

With the foregoing in mind, the present invention advantageously provides a barbecue smoker device for placing in a barbecue grill and generating flavoring smoke when heated. The barbecue smoker device includes a leakproof noncombustible body having an inner cavity, an opening positioned to connect to the inner cavity to thereby provide access to the inner cavity, presoaked wood chips positioned within the inner cavity to thereby generate smoke when the barbecue smoker device is heated in the barbecue grill, and a lid positioned on said opening to thereby hermetically seal the presoaked wood chips within said inner cavity.

DESCRIPTION OF THE DRAWINGS

Some of the features, advantages, and benefits of the present invention having been stated, others will become apparent as the description proceeds when taken in conjunction with the accompanying drawings in which:

FIG. 1 is a barbecue smoker device according to an embodiment of the present invention; and FIG. 2 illustrates the barbecue smoker device properly positioned within a gas fired barbecue grill for producing flavoring smoke.

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

FIGS. 1 and 2 illustrate a barbecue smoker device 10 for placing in a barbecue grill 20 and generating flavoring smoke when heated. The barbecue smoker device 10, as best shown in FIG. 1, includes a leakproof noncombustible body 16 having an inner cavity, and an opening positioned to connect to the inner cavity to thereby provide access to the inner cavity. A quantity of presoaked wood chips 14 is positioned within said inner cavity to thereby generate smoke when the barbecue smoker device 10 is placed in the barbecue grill 20, as best illustrated in FIG. 2. A lid 12 is positioned on the opening to thereby hermetically seal the presoaked wood chips 14 within the inner cavity of the barbecue smoker device 10. In a preferred embodiment of the invention, as shown in FIG. 1, the barbecue smoker device 10 is a metal can having a pop top manually removable by pulling on a ring tab, the can being of the type used for various food products, as known to those skilled in the art. The lid 12 may be a fully removable pop top, or may be at least partially removable, such as known in the art for canned soft drinks. The presoaked wood chips 14 are preferably presoaked in water and packed under vacuum condition. In addition, other flavoring means may be added to the presoaked wood chips 14 for producing smoke having an enriched flavor. Preferred flavoring means, also referred to herein as flavoring substances, include all spices used in cooking, and especially those traditionally used in barbecue recipes, such as tomatoes, hot peppers, mustard, honey, molasses, black pepper, garlic, menthol, and sauces made thereof. These flavoring substances may be mixed with water for presoaking the wood chips 14. Alternatively, the wood chips 14 may be presoaked directly in a sauce prepared with the desired flavoring means. In a preferred embodiment of the barbecue smoker device 10, the leakproof noncombustible body 16 is made of metal.

The present invention provides advantages which solve various problems not appreciated in the prior art. The Gaines smoke generating device teaches away from the present invention by emphasizing that the size of the holes in the device is crucial. Gaines teaches that a hole that is too large will admit sufficient air to support combustion of the wood chips and will allow flaming fat to drip into the device, also causing the wood chips to ignite, which is undesirable for proper smoke production. A preferred embodiment of the present invention, as shown in FIG. 1, has a large opening and yet does not suffer from the disadvantages predicted by Gaines due to the large opening. Gaines did not employ presoaked wood chips and did not appreciate that the use of presoaked wood chips 14, as in the present invention, would overcome the problems of uncontrolled ignition of the wood chips, particularly as related to dripping burning fat. The use of presoaked wood chips 14 in the present invention allows a barbecue smoker device 10 having a large upwardly facing opening to efficiently release smoke. Such a large opening is directly contrary to the teaching of Gaines for preventing undesired ignition of the wood chips.

In addition, Gaines, Holmes and Cofer all teach that it is important to restrict the flow of air to the wood chips to prevent their undesired ignition. Gaines and Cofer restrict such air flow by having only small openings into their respective containers. Holmes only mentions the problem but does not provide a solution. The present invention also restricts fresh air flow to the wood chips 14, albeit in a manner unrecognized by the prior art. A preferred embodiment, as shown in FIGS. 1 and 2, is a metal can containing the presoaked wood chips 14 therein. The opening exposing the wood chips 14 to the air is preferentially positioned so that it is on the upward side of the device when the device is placed in the barbecue. There is no other opening to help create an air flow into the device, and because the wood chips 14 are stacked on one another inside the cavity of the device, air is restricted from reaching the wood chips 14 in the interior of the stack. The wood chips 14 in the present invention, therefore, produce smoke and do not ignite due to excess air flow, even when exposed through a large opening and contrary to the teachings of Gaines, Holmes and Cofer.

The present invention provides a simple, previously unappreciated solution to the problems identified by the prior art through its use of presoaked wood chips 14, processed and packaged through commercial canning methods well known to those having skill in the art. The metal can employed in a preferred embodiment of the present invention is uncomplicated, and generally easily available for commercial production, unlike the specialized containers used by Gaines and Cofer. As opposed to the prior art, the manufacture of the present invention requires no special machinery other than that already existing and in use in commercial canning houses. An especially advantageous feature of the present invention is that the smoker device itself also functions as the shipping and marketing container, thus the invention requires no repackaging for commercial sale. In contrast, the prior art requires additional packaging, either to cover the smoke exhaust holes or to enclose the complete invention, such as in Holmes' wood chip and gelatin blocks.

There are still further advantages of the present invention over the prior art. For example, Cofer recommends that his device be placed in the barbecue in a tilted orientation to promote escape of the smoke and to prevent ignition of the wood chips. The present device is simply placed upright into the barbecue without the inconvenient requirement for further positional adjustments. Cofer suggests that if the wood chips in his device ignite, the user may simply blow on or splash water onto the container to put out the fire. This is unrealistic, since the Cofer device has very small holes and it will be difficult for the user to force sufficient water into the cylinder to extinguish the fire. In contrast, the wood chips 14 in the present invention are easily doused with water through the large opening in the case of an unexpected flareup, which is an unlikely event due to the wood chips 14 being presoaked and the restricted air flow into the pile of wood chips 14. Other prior art, the Holmes flavoring blocks, includes wood chips mixed in a water solution of gelatin, so that presumably the wood chips are presoaked. The Holmes invention, however, is an uncontained block of wood chips bound together by the hard gelatin, and when placed into the barbecue the combination of melting gelatin, wood resins, added flavorings, and ash are highly likely to foul the burners in a gas fired grill 20, a major problem with the Holmes invention. No prior art, nor combination thereof, makes a suggestion that presoaked wood chips 14 be packaged in the ready to use smoker device of the present invention, which serves both as the shipping container and as the smoker device for placing directly into the barbecue.

As further illustrated in FIGS. 1 and 2, the present invention also includes a method for generating flavoring smoke in a barbecue grill 20. The method includes the steps of placing in the barbecue grill 20 a barbecue smoker device 10 having a leakproof noncombustible body 16 including an inner cavity, an opening positioned to connect to the inner cavity to thereby provide access to the inner cavity, presoaked wood chips 14 positioned within the inner cavity to thereby generate smoke when the barbecue smoker device 10 is placed in the barbecue grill 20, and a lid 12 positioned on the opening to thereby hermetically seal the presoaked wood chips 14 within the inner cavity. The method further includes the steps of at least partially removing the lid 12 to thereby expose the presoaked wood chips 14, and lighting a fire in the barbecue grill 20 to thereby heat the barbecue smoker device 10 causing the presoaked wood chips 14 to emit the flavoring smoke. The method alternatively includes the step of placing the barbecue smoker device 10 directly into the fire of the barbecue grill 20. The present barbecue smoker device and its associated method may be used with any type of barbecue grill, including a standard charcoal grill, but are particularly well suited for providing flavoring smoke in a gas fired barbecue grill.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A barbecue smoker device for generating flavoring smoke when heated in a barbecue grill, said barbecue smoker device comprising:

a) a metal can having a body including an inner cavity, and an opening positioned on an upper surface of the body, the opening connecting to the inner cavity to thereby provide access to the inner cavity;

b) a removable lid positioned on the body so as to cover the opening and hermetically seal the inner cavity, to thereby open the barbecue smoker device and expose the inner cavity when the lid is removed;

c) presoaked wood chips packed under vacuum within the inner cavity, for generating flavoring smoke when the open barbecue smoker device is heated in the barbecue grill.

2. The barbecue smoker device of claim 1 wherein said lid is at least partially removable to thereby expose the presoaked wood chips.

3. The barbecue smoker device of claim 1 wherein said presoaked wood chips are presoaked in water.

4. The barbecue smoker device of claim 1 wherein said presoaked wood chips further comprise added flavoring means for producing smoke having enriched flavor.

5. The barbecue smoker device of claim 1 wherein said lid is manually removable.

6. A method for generating flavoring smoke in a barbecue grill, said method comprising the steps of:

a) placing in the barbecue grill a barbecue smoker device comprising a metal can having a body including an inner cavity and an opening positioned on an upper surface of the body, the opening connecting to the inner cavity to thereby provide access to the inner cavity, a removable lid positioned on the body so as to cover the opening and seal the inner cavity, to thereby open the barbecue smoker device exposing the inner cavity when the lid is removed, and presoaked wood chips packed under vacuum within the inner cavity, for generating flavoring smoke when the open barbecue smoker device is heated in the barbecue grill;

b) at least partially removing said lid to thereby expose the presoaked wood chips;

c) lighting a fire in the barbecue grill to thereby heat the barbecue smoker device causing the presoaked wood chips to emit flavoring smoke.

7. The method of claim 6, wherein said presoaked wood chips are presoaked in water.

8. The method of claim 6, wherein said presoaked wood chips further comprise added flavoring means for producing smoke having enriched flavor.

9. The method of claim 6, wherein said lid is manually removable.

10. The method of claim 6, wherein said barbecue smoker device is placed directly into the fire of the barbecue grill.

11. Wood chips presoaked in water for generating flavoring smoke in a barbecue fire, said wood chips vacuum packed in a metal can having a removable top including a pulling ring connected thereto for aiding in removing said top.

12. The product of claim 11, wherein said removable top is fully removable.

13. The product of claim 11, wherein said wood chips are presoaked in a water-based sauce suitable for producing smoke having enriched flavor for barbecuing.

14. The product of claim 11, wherein said wood chips are packed under vacuum in said metal can.

* * * * *